Figure 1:
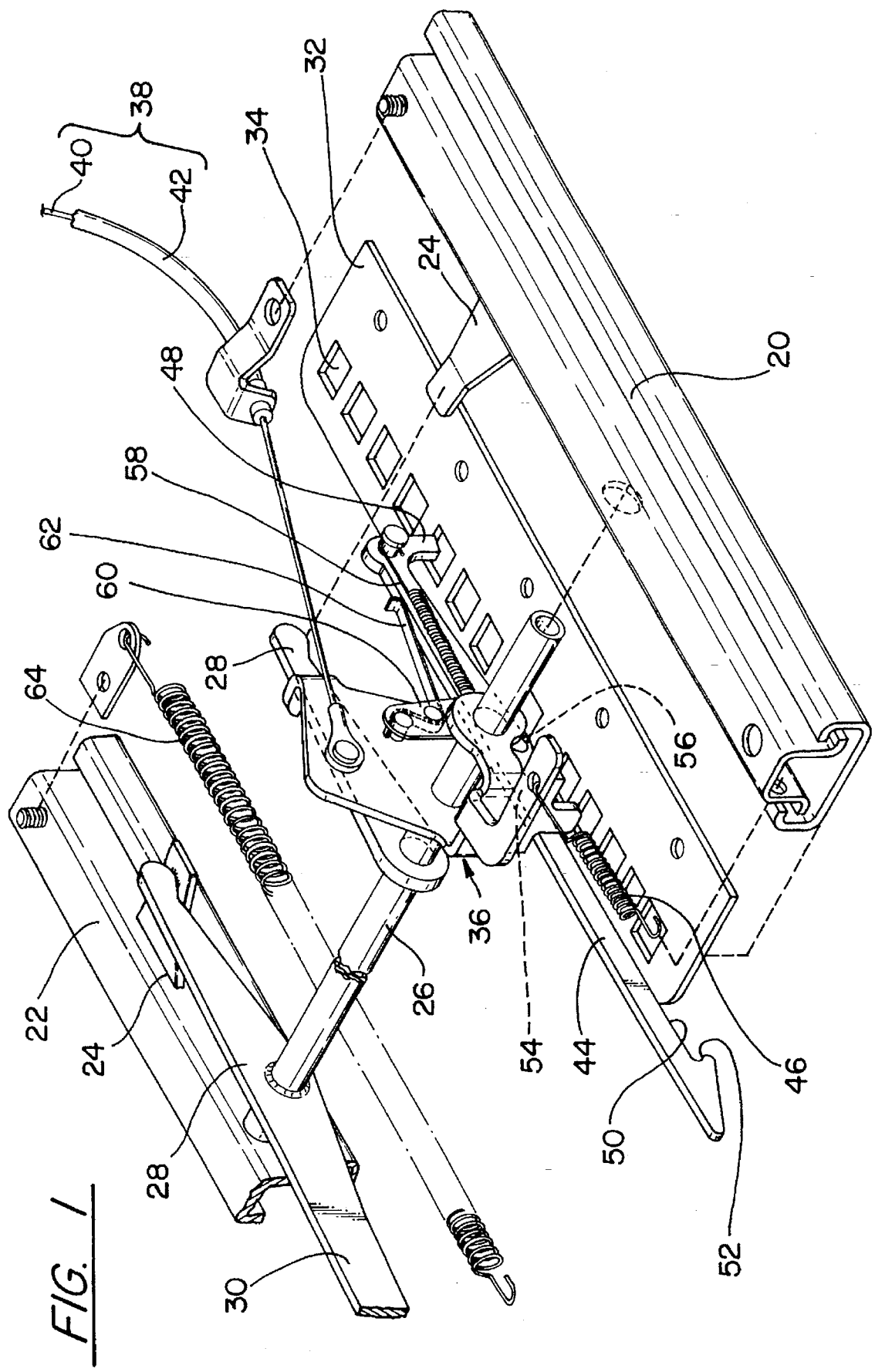

United States Patent [19]

Bauer et al.

[11] Patent Number: 5,626,392

[45] Date of Patent: *May 6, 1997

[54] MOTOR VEHICLE SEAT MOVABLE IN THE LONGITUDINAL DIRECTION IN THE TIPPED STATE

[75] Inventors: Heinz Bauer; Burckhard Becker; Ernst-Reiner Frohnhaus, all of Solingen, Germany

[73] Assignee: C. Rob Hammerstein GmbH & Co. KG, Solingen, Germany

[ * ] Notice: The term of this patent shall not extend beyond the expiration date of Pat. No. 5,352,017.

[21] Appl. No.: 444,241

[22] Filed: May 18, 1995

[30] Foreign Application Priority Data

May 19, 1994 [DE] Germany ............ 44 17 447.0

[51] Int. Cl.$^6$ .................. A47C 1/06; B60N 2/02
[52] U.S. Cl. .................. 297/341; 297/378.12
[58] Field of Search ............ 297/341, 378.12; 248/550

[56] References Cited

U.S. PATENT DOCUMENTS

| | | | |
|---|---|---|---|
| 3,940,182 | 2/1976 | Tamura | 297/341 |
| 4,015,877 | 4/1977 | Button | 297/341 |
| 4,065,178 | 12/1977 | Carella et al. | 297/341 |
| 4,101,169 | 7/1978 | Muraishi et al. | 297/341 |
| 4,607,884 | 8/1986 | Heling | 297/341 |
| 4,652,052 | 3/1987 | Hessler | 297/341 |
| 4,707,030 | 11/1987 | Harding | 297/341 |
| 4,822,101 | 4/1989 | Hasoe | 297/341 |
| 4,844,542 | 7/1989 | Humer | 297/341 |
| 4,852,846 | 8/1989 | Weier | 297/341 X |
| 4,881,774 | 11/1989 | Bradley et al. | 297/341 |
| 5,020,853 | 6/1991 | Babbs | 297/341 |
| 5,137,331 | 8/1992 | Colozza | 297/341 |
| 5,352,019 | 10/1994 | Bauer et al. | 297/341 |
| 5,390,980 | 2/1995 | Premji et al. | 297/378.12 |

FOREIGN PATENT DOCUMENTS 2419050  11/1979  France ............ 297/341

Primary Examiner—James R. Brittain
Assistant Examiner—Rodney B. White
Attorney, Agent, or Firm—Quarles & Brady

[57] ABSTRACT

A motor vehicle seat with a longitudinal guide that has a locking device. The seat has a backrest which has a release lever for tilting the seat forward. The operation of the release lever releases the backrest from a normally upright position and allows it to be tipped forward. The backrest is connected to the locking device of the longitudinal guide by means of a release mechanism so that when backrest is tipped forward, the locking device can be released and the motor vehicle seat can be moved manually in the longitudinal guide. Alternatively, if the backrest is in the upright position, the locking device is either ready to be operated, or in the process of operating. A memory device is provided for finding a position where the locking device was previously engaged following the longitudinal movement of the seat along the guide.

11 Claims, 3 Drawing Sheets

MOTOR VEHICLE SEAT MOVABLE IN THE LONGITUDINAL DIRECTION IN THE TIPPED STATE

The invention relates to a motor vehicle seat with a longitudinal guide that can be locked, with a backrest that can be tipped forward and which is connected to a release lever for the tipped state which allows the backrest, normally blocked in an upright position, to be released and tilted forward and a memory device for again finding the previously engaged position of the locking device following such a longitudinal movement.

In particular, in two door passenger cars with rear seats a problem exists in that access to the rear seats via the doors is limited by the front seats. For the motor vehicle seat from the DE-A-42 01-829 the front seat can be moved in the longitudinal direction, by working a release lever at the backrest of such seat initially and by tilting the backrest. In this position the locking device of the longitudinal guide is released and the seat can be moved freely back and forth. For easier access to the rear seats the backrest is tilted forward initially and then moved back again to the upright position again. With the known motor vehicle seat a memory device is provided allowing the previously engaged position of the longitudinal movement to be taken again after the movement.

By tilting the backrest with the known motor vehicle seat a first lever is pivoted which acts on a second lever operating the locking device and which blocks the second lever in such position in which the locking device is released. Later the blocking of the two levers is released by a memory device. This order has shown some practical success but it leads to difficulties, particularly if the seat after having been moved forward is not moved back to the stop and the backward movement is finished before the stop marked by the memory device is reached.

Further motor vehicle seats are known where the tilting movement of the backrest is synchronized with the movement of the longitudinal tracks. Reference is made to DE-A-36 08 827 and DE-A-30 36 559 and DE-A-28 13 534. With the known motor vehicle seats the backward movement is always completed after the seat has been moved forward if the backrest is prestressed accordingly, either manually with the backward movement or by a passenger. The disadvantage of such motor vehicle seats lies in relatively complicated structure, the synchronization of such two movements requires a relatively expensive construction.

The task of the invention is to further develop the above mentioned motor vehicle seat DE-A-42-01-829 of a relatively easy construction in such a way that there is always a complete stop when the backrest is in the normal upright position independent from the relative position. This task is solved by a motor vehicle seat with characteristics according to claim 1.

With such motor vehicle seat the backrest is automatically connected with the operation of the locking device, so that the backrest functions as an operating lever for the locking mechanism. In addition to the provided lever for the locking device, the locking device can be used by tilting the backrest sufficiently forward, independently from the relative position of the longitudinal tracks. Each time the backrest is tilted forward sufficiently enough, for example, tipped forward by at least 80° preferably 95° of its maximum angle of traverse, the locking device is released and the seat can be moved forward in the longitudinal track and then moved as far as desired. As soon as the backrest is tilted back in the upright normal position, the locking device is ready to grip. Depending on the interpretation of the construction of the locking device it will grip directly, or a relating movement between the tracks is necessary for a catch to occur.

A motor vehicle seat is known from the DE-A-42 01 829 where a memory device is provided. Such device shows a relatively simple construction, because a synchronization between the tilting forward of the backrest and the shifting forward of the seat is not provided. The memory device takes advantage of the fact that after the tilting forward of the backrest the seat can only be moved forward. As soon as it is moved back to the same extent, a stop and a counterstop touch and restrict a further backward movement.

In a preferred embodiment the memory device shows a notch bar which is not a part of the locking device. This makes it possible to add further construction parts of the memory device to the motor vehicle seat later. In the production process the memory device can be attached at a relatively late stage, for example when the motor vehicle seat is nearly or completely finished.

In a preferred embodiment the memory device shows a memory bar, which leads flexibly into a catch sheet, the sheet being attached to a seat rack of the longitudinal guide, a memory bar forms a memory pin co-operating with the notch of a notch bar. Furthermore, the memory bar ha a stop, said stop being attached to a counterstop at the catch sheet, between memory bar and catch sheet a return spring is attached holding stop and counterstop in construction and said spring prestressing the memory bar showing the end of the memory pin leading to the catch sheet. Said catch sheet is in a tiltable position so that the memory bar can be tipped from a normal position in which the memory pin does not co-operate with the notch bar to an engagement position in which memory pin and notch bar co-operate. This results in a relatively easy construction of the memory device as only relatively few parts are needed. The memory device is attached to one of the two track pairs of the longitudinal guide preferably.

The release device is preferably equipped with a Bowden wire said Bowden wire engages on one hand at the backrest in the distance of the cardan swivel of the backrest and on the other hand at the tiltable catch sheet, so that a movement of the backrest leads to a pivoting movement of the catch sheet out of its normal position. The Bowden wire enables an optional, constructional embodiment of the base of the seat meaning the part between seat support and the pair of tracks. For example, a device for an elevation adjustment can be provided. Independently from the constructional embodiment in this position the implementation of a construction of a Bowden wire is possible.

It has proven to be very advantageous to design a holding device keeping the backrest in the tipped state. In this position the locking device of the longitudinal track is released at the same time. The backrest can either be kept in its tipped state in due form and only be tilted in its normal position after the release of a locking device, it can also be kept in the tipped state by clamping device, so that after having overcome the clamping power the backrest can be tilted in its normal position. The use of this holding device makes the operation of the motor vehicle seat more reasonable and easier.

Figure 2:
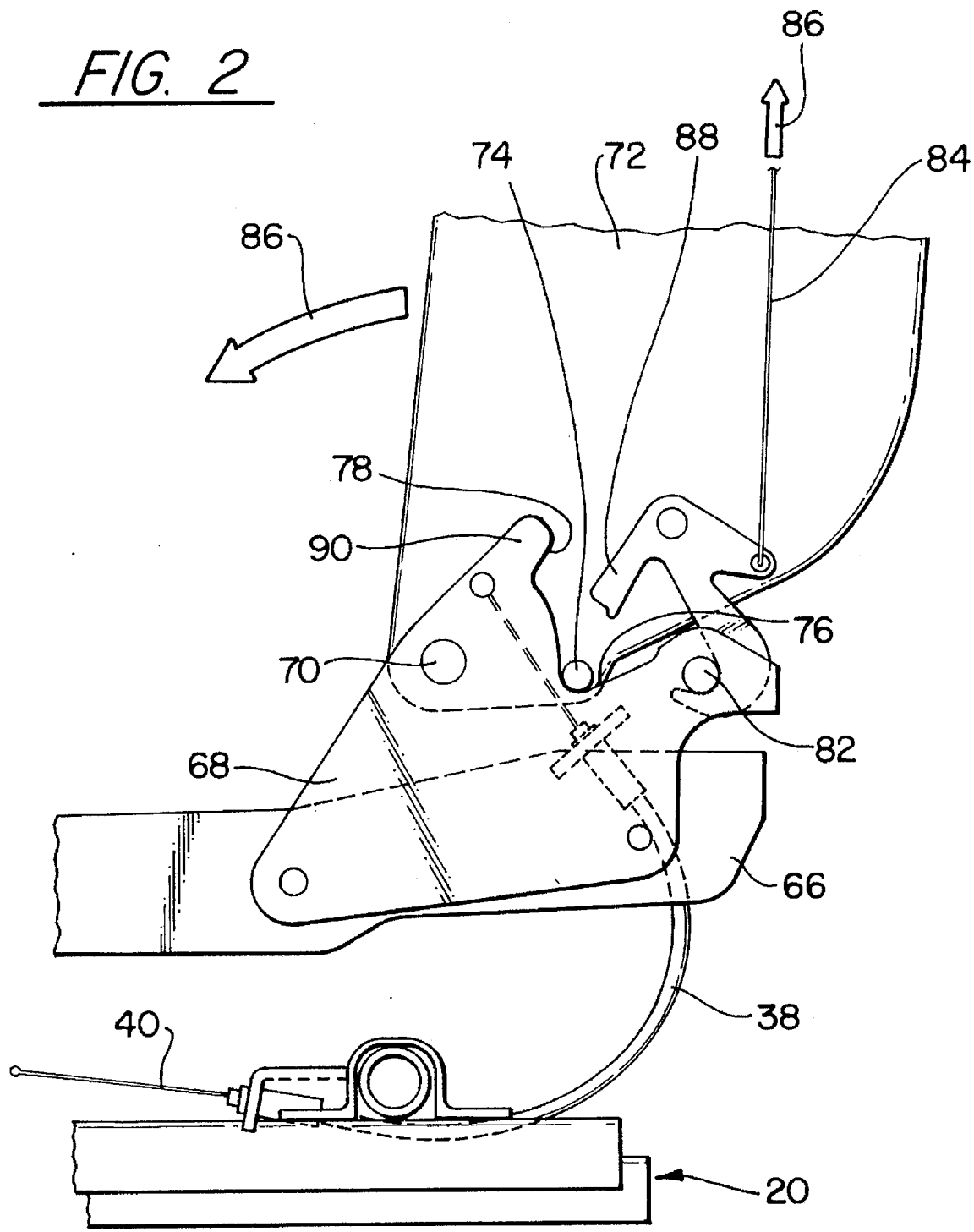
Figure 3:
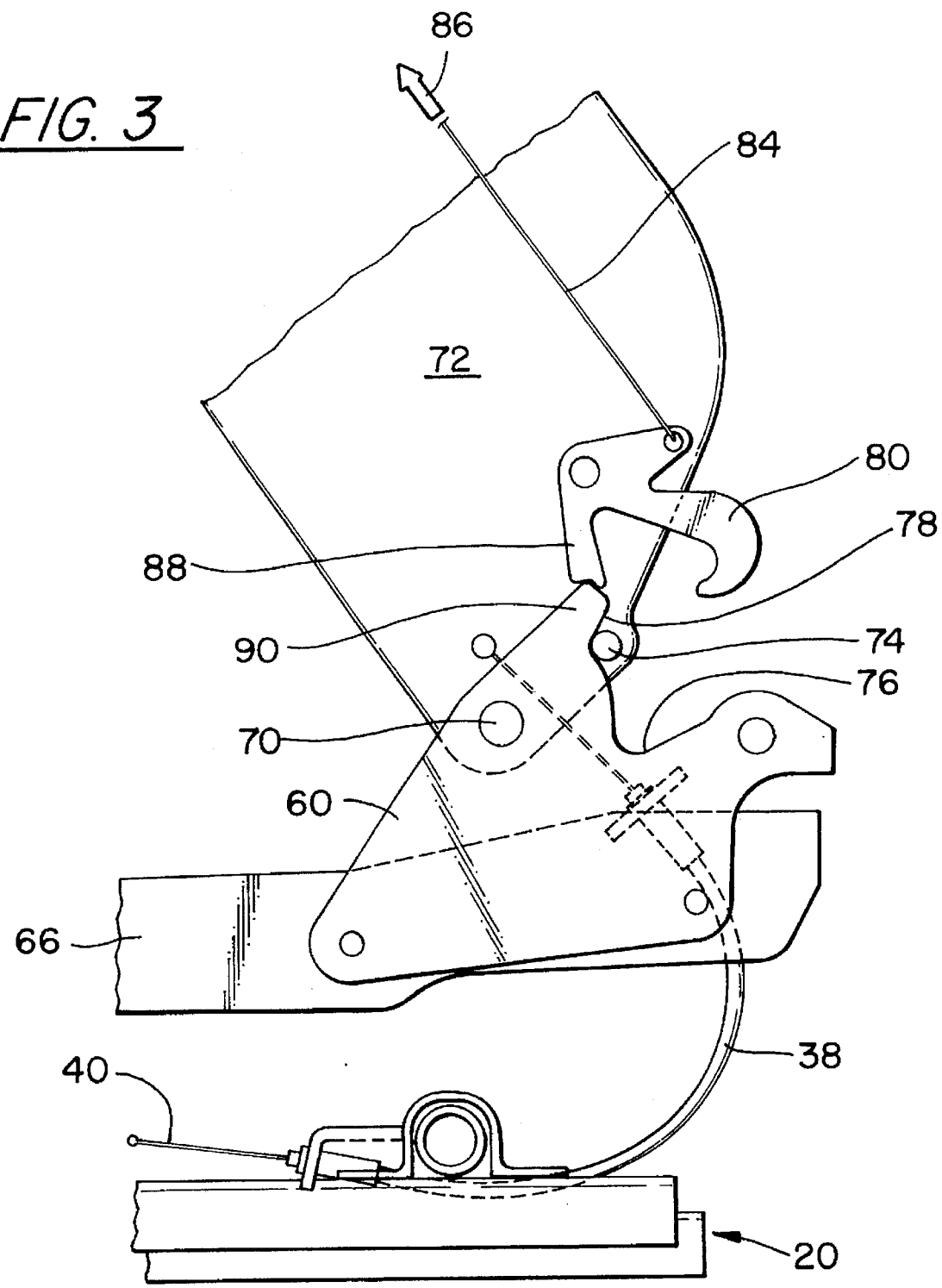

Further advantages and characteristics of the invention result from the other claims, as well as from the following description of an exemplified non limiting embodiment of the invention, which is explained in further detail in the drawing. This drawing shows:

FIG. 1: a perspective view of a base of a motor vehicle seat with a longitudinal guide constructed of two paris of tracks and showing a locking device as well as a memory device, FIG. 2: a side-view of the back part of a motor vehicle seat with the rest in the upright normal position, and FIG. 3: the illustration corresponding to FIG. 2 but with the backrest in the tipped state.

FIG. 1 shows the base part of a motor vehicle seat comprising a longitudinal guide with two paris of tacks 20, 22 which are attached to a locking device 24, known and not further described here. Said locking device rests normally flexibly prestressed in a blocked position. The two upper tracks meaning the seat tracks of the two paris of tracks 20, 22 are connected with each other by a shaft 26, being embodied as transmission tube exactly. Two tipping levers 28 are attached to said shaft with twisting strength, resting on an operating sheet of the respective locking device 24 with their free back part ends. A tipping lever 28 is extended to a hand lever 30 via the shaft 26, as said shaft being pulled upwards, both locking devices 24 will be released.

A memory device is attached to the right pair of tracks 20 illustrated in FIG. 1, said memory device will be described as follows. It shows a separate notch bar 32 showing notch openings 34 which are formed as notch windows here. It can later be attached to the floor track of said pair of tracks 20, as shown by a dotted arrow. Normally its notch openings 34 are distributed over a distance corresponding to the maximum longitudinal adjustability of the corresponding pair of tracks 20.

At the shaft 26 a swingable catch sheet 36 is attached which shows a complicated structure in the exactly drawn exemplified illustration. It is bent by means of a blank of a metal sheet, it has two pivot openings being situated in a distance from each other, and with which it encloses shaft 26. This stops a tilting out of a radial plane of the shaft 26. The catch sheet 26 rests with one arm on the tipping lever 28 attached to the pair of tracks 20. The Bowden wire 38 also engages at this arm with the bore 40 being pivoted to it. The cover 42 is kept in a bearing block and said cover is fixed to a respective seat track of the pair of tracks 20 as shown by a dotted arrow. Between the two bearing openings of the catch sheet 36 already described a part of said catch sheet 36 projects to the exterior and in it a slot is formed. Furthermore a respective slot is formed in the part connecting the two bearing openings. These two slots guide a memory bar 44. A bolt spring 26 is provided, which engages to the area of the slot described first and which keeps the catch sheet 36 in a defined position, being the normal position. By this the memory bar 44 is also kept in its normal position. The memory bar shows a memory pin 48 at its back end if FIG. 1, said pin projects downward and is formed in such a way, that it can co-operate with the notch openings 34 of the notch bar 32. The memory bar shows a gliding plane 50 on its bottom part, which is limited by a stop at the front 52 and a stop 54 at the back. The latter is difficult to see in FIG. 1. Attached to it there is a bolt 56 acting as a counter stop and named support or boundary bolt. On said bolt the gliding plane is placed. The memory bar 44 with its end showing the memory pin 48 is flexibly prestressed to the shaft 26 by a return spring 58 which is attached between the back part of the memory bar 44 showing the memory pin 48 and the shaft 26, because of this, the stop is normally close to the counterstop being formed by the bolt 56.

Finally an arm 60 projects from the catch sheet 36, on which an indent spring 62 is attached named flat spring. With its free, flexible arm it is situated on the top of the memory bar 44 near the memory pin 48. Its spring power is not sufficient to make the memory pin 48 engage with the notch bar 32, illustrated in FIG. 1 in the illustrated normal position of the tiltable catch sheet 36. If the catch sheet 36 however, is tipped out of its normal position by prestressing the bore 40, it will take the memory bar 44 with it in its tilting movement. The memory bar can now engage with a notch opening 34 with its memory pin 48 should there be one under the memory pin 48. If there is none, the memory pin will glide over the notch bar 32 with a relative motion of the tracks of the track pair 20 and catch the next notch opening 34.

If the locking devices 24 are operated by a manual lever 30 the catch sheet 36 will stay in its normal position and the memory pin 48 cannot co-operate with the notch opening 34. An engagement of the memory pin 48 into a notch opening 34 is only possible when the catch sheet 36 is swivelled out of its normal position.

When moving the seat the following occurs: If the backrest is moved from its normal position into the tipped state, this results in a traction of the bore 40, the detailed procedures will be explained later with reference to FIGS. 2 and 3. This will lead to the described swivelling of the catch sheet 36 from its normal position, said catch sheet 36 unlocks via the tipping lever 28 the two locking devices 24 of the two pairs of tracks 20 on one hand, on the other hand, the memory bar 44 is swivelled in such a way, that the memory pin 48 can engage into a notch opening 34. Such an engagement will occur at the latest, when the seat is moved to the front, meaning the upper seat track of the two pairs of tracks 20 is moved forward in FIG. 1 to the bottom left. As soon as the memory bar 48 is in engagement with an notch opening 34 the return spring does not take the memory bar with it with further shifting movements, the memory bar rather glides into the catch sheet 36 of its tracks. This movement is finished at the latest, when the bolt 56 hits the stop 52. If the seat is moved back again, the return spring relaxes, the memory pin 48 moves further to the shaft 26 until the stop 54 reaches the bolt 56. Then a further shifting movement of the seat is blocked. The seating position adjusted before the shifting movement is reached again.

If the backrest tilted back into its normal position after or during the shifting movement, the bore 40 becomes tension-free, the catch sheet 36 can return to its normal position as shown in FIG. 1, it will not put downward pressure on the tipping levers 28, the two locking devices are therefore back in the located state. At the same time the memory pin 48 is released from the notch bar 32. The memory function is only exercised, when the seat is tilted back to the stop. If that does not happen, the longitudinal guide is locked but the seat is in a different relative position than before the shifting movement.

In FIG. 1 a supporting spring 64 is planned which supports the movement of the seat to the front.

It is evident from FIGS. 2 and 3 how by moving the backrest, the bore 40 of the Bowden wire 38 is pulled and how by this the catch sheet 36 is swivelled out of its normal position. Both figures illustrate the already mentioned pair of tracks 20, to which the memory bar is attached. The bearing block of the cover 42, which is connected to the seat track is illustrated. On top of this pair of tracks 20 a seat support 66 is situated. Its connection to the pair of tracks 20 is not illustrated as it can be optional, for example an upward movement device could be provided. On the seat support 66 a metal fitting part 68 is attached which forms a swivelling axle 70 for the backrest. Of this a backrest metal fitting part 72 is illustrated. From this, a stop 74 formed as a bolt projects into the level of the metal fitting part 68. To this two flanks 76 and 78 are attached to the metal fitting part 68. By these two flanks 76, 78 and the stop 74 the maximum position of swivelling of the backrest is determined. The two extreme swivelling states are illustrated in FIG. 2 (normal position) and FIG. 3 (highest tipped state of the backrest).

In the normal position the backrest is secured by a catch 80 which is attached to the backrest metal fitting part 72 in a flexible position and which co-operates with a pin 82 projecting from the metal fitting part 68. The locked state is illustrated in FIG. 2 via a pull rod, which can be operated by a release lever at the upper part of the backrest, the catch 80 can be swivelled anti-counterclockwise in such a way, that it is released from the pin 82. Then the backrest can be tipped forward according to the arrow 86, until the position according to FIG. 3 is reached.

The catch 80 has an additional arm 88, which glides with its free end faceon a catch 90 of the metal fitting 68. Both surfaces harmonize with each other. This leads to the clamping position illustrated in FIG. 3, in which the arm 88 lies on the catch 90 in such a way, that a resistance is built against the upright tilting of the backrest. As soon as such resistance is overcome, the backrest can be put in the upright position, the catch 80 seized underneath the pin 82 so that the normal locked position according to FIG. 2 is reached again.

According to FIGS. 2 and 3 the bore 40 is attached to its other end at the backrest metal fitting part 72, while the cover 42 is fixed to said metal fitting part 68. By swivelling the two metal fitting parts 68, 72, the bore 40 is pulled in such a way that the catch sheet 36 as described above is swivelled out of its normal position.

In a changed embodiment no notch openings 34 are planned at the furthest part of the control way of the longitudinal guide in the notch bar 32. For example, there are no notch openings 34 projecting for the last 10% of the shifting way backwards, even though there is the notch bar 32 in this part, it does not offer any possibility for the memory pin 48 to engage, said pin can only glide on its surface. If the seat moved forward from a position right from the back, the memory device seizes only after a certain shifting way. When moving the seat backwards the position right in the back cannot be reached again, as the backward movement is already blocked before that. The last way backwards has to be put in place manually. People sitting in the back will not have their legs squashed, when the seat rest is moved back.

Another embodiment shows the catch 80 having a further catch area, which seizes a pin from behind according to FIG. 3 in a totally retracted position. The pin is planned for a metal fitting part 68. The locking device can be released by pulling the pull rod 34 or if necessary by pressure if this pressure bar for equalizing the pull rod is projected.

We claim:

1. A motor vehicle seat comprising
    a) a longitudinal guide that can be locked by means of a locking device (24),
    b) a backrest that can be tipped forward, said backrest having a release lever for tilting the seat forward, and whose operation releases the backrest from a locked upright position, and allows said backrest to be tipped forward, said backrest connected to the locking device (24) of the longitudinal guide by means of a release mechanism so that when the backrest is tipped forward, the locking device (24) of the longitudinal guide can be released and the motor vehicle seat can be manually moved by a user along said longitudinal guide and that if the backrest is in the upright position the locking device (24) is either one of ready to operate or operating and
    c) a memory device for again finding a previously engaged position of the locking device (24) following said longitudinal movement in the said longitudinal guides.

2. A motor vehicle seat according to claim 1 characterized in that the memory device comprises a notch bar (32) which does not co-operate with the locking device (24).

3. A motor vehicle seat according to claim 1, wherein the memory device comprises a memory bar (44), said memory bar guided into a catch sheet (36) in an adjustable way, which is coordinated with a seat track of the longitudinal guide, the memory bar (44) having a memory pin (48), which co-operates with notches of a notch bar (32) said memory bar (44) further comprising a stop (54), said stop co-ordinated with a counterstop (bolt 56) attached to said catch sheet (36), between the memory bar (44) and the catch sheet (36) a return spring (58) is attached, said return spring elastically biasing the memory bar, so that its stop is held in contact with the counterstop and which prestresses an end of the memory bar (44) holding the memory pin (48), to the catch sheet (36), and said catch sheet (36) is in a tiltable position, so that the memory bar (44) can be tilted from one position in which the memory pin (48) does not co-operate with the notch bar (32) into a position where the memory pin (48) and the notch bar (32) engage.

4. A motor vehicle seat according to claim 1 wherein said release mechanism comprises a Bowden wire (38) attached at one end to the backrest, spaced a distance from the backrest joint, and attached at the other end to a tiltable catch sheet (36), so that by moving the backrest forward said catch sheet (36) is tilted from its normal position.

5. Motor vehicle seat according to claim 1 characterized by a holding device keeping the backrest in its tipped position.

6. Motor vehicle seat according to claim 5 characterized in that the holding device shows a blocking device, which can be operated via a release lever.

7. Motor vehicle seat according to claim 5, characterized in that the holding device shows a flexible clamping device, which can be overcome at the backrest after engagement of a given momentum.

8. Motor vehicle seat according to claim 1, characterized by the catch sheet (36) being prestressed flexibly in a normal position, in which the memory pin (48) is not found in the catch of the notch bar (32).

9. Motor vehicle seat according to claim 1, characterized in that the longitudinal guide has two tracks, and a connecting shaft (26) is provided, which connects the two tracks, the catch sheet (36) rests on the connecting shaft (26), on which a manual lever (30) for operation of the locking device (24) is set.

10. Motor vehicle seat according to claim 9, characterized in that the catch sheet (36) is set swingably in a radial plane on the connecting shaft (26).

11. Motor vehicle seat according to claim 9 or 10, characterized by an arm (60) being attached to the connecting shaft (26) on which an engaging spring (62) prestressing an end of the memory bar (44) is set, and said end showing the memory pin (48).

* * * * *